Inventors
Masami Yamada
Michio Tamura
Hiroshi Adachi

Inventors
Masami Yamada
Michio Tamura
Hiroshi Adachi

Inventors
Masami Yamada
Michio Tamura
Hiroshi Adachi

United States Patent Office 3,437,482
Patented Apr. 8, 1969

3,437,482
ACCURATE REGISTRATION OF PHOSPHOR STRIPS IN KINESCOPES BY MEANS OF A TRANSPARENT PHOTOGRAPH OF THE POST-DEFLECTION GRID IN COMBINATION WITH A POSITIONING MASK
Masami Yamada, Tokyo, Michio Tamura, Fujisawa-shi, and Hiroshi Adachi, Yokohama-shi, Japan, assignors to Sony Corporation, Tokyo, Japan, a corporation of Japan
Filed Apr. 6, 1966, Ser. No. 540,671
Claims priority, application Japan, Apr. 16, 1965, 40/22,621
Int. Cl. G03c 5/06
U.S. Cl. 96—36.1      15 Claims

ABSTRACT OF THE DISCLOSURE

A method of manufacturing striped screen surfaces such as used in post-deflection kinescopes in which the pattern on the screen surfaces is determined by photographic processes. A photographic negative is produced and an optical mask is made from the negative. The mask is then used to produce the screen surface.

---

This invention relates to color television and is more particularly concerned with a new and improved method for manufacturing color television receiver kinescopes. The invention is particularly applicable to the manufacture of striped screen surfaces of the type used in post-deflection-focusing kinescopes.

In a post-deflection kinescope, such as the chromatron, a large number of generally parallel grid wires are arranged in a generally planar surface spaced a short distance from a screen formed to have interwoven generally parallel strips of different colored light emitting phosphors. The grid is positioned within the tube so that the single scanning electron beam of the kinescope must pass through the grid to impinge on the screen. The electron beam is density modulated with the detected video information signal including an undetected color subcarrier signal modulated at different phases with color information relating to different hues. By applying a switching signal to the grid wires, the electron beam may be caused to be deflected to any one of the different phosphor strips to excite that phosphor to emit light of its hue. By proper choice and phasing of the switching signal on the grid, the color information may be demodulated in the kinescope itself and a color image, acceptable to the human eye, reproduced on the screen. Because of its mode of operation this general type of color kinescope is often termed a self-decoding kinescope.

In practice, the phosphor strip of the screen of such a color kinescope is not formed to be precisely parallel because of electron beam distortions generated by the deflection of the beam in scanning, the geometry of the tube, and the distortion of the electron beam trajectory in the space between the switching grids and the screen caused by the post-acceleration field. This latter distortion is increased with the greater deflection angle of the electron beam. The position of the phosphor strips is normally altered to eliminate or reduce the adverse effects of the distortions. Because of the varying degree of these effects, the precise arrangement of the phosphor strips to correct this varies in a manner which is quite complicated. Accordingly, in the production of the phosphor strip screen of the chromatron type quite a difficult manufacturing process is involved. Such screens are normally formed by a photographic-type process in which an optical mask is placed between a light source and a sensitized screen face plate. The light exposes part of a sensitized screen surface which surface part is subsequently coated with a phosphor of a primary color. The process is repeated until an entire phosphor screen is formed on the face plate.

Thus, in the production of the phosphor strips of the chromatron-type tube through the use of such an optical mask, the positioning of the optical mask relative to the color-switching grids is very difficult. For this positioning, one prior method that has been proposed is disposing the optical mask opposite to the face plate and having mounted thereon switching grids projecting by kinescope the patterns of the mask, while at the same time adjusting the location of the mask such that a spurious pattern, the so-called moiré pattern, which is produced by interference of light between the patterns of the mask and the grids, appears in a manner predetermined to correspond to the optimum arrangement. With this method, however, the spurious pattern is so complicated that the positioning of the optical mask relative to the grid cannot be carried out with great accuracy. Furthermore, this method requires considerable time on the part of the person carrying out the operation and often leads to nonuniformity in the quality of the output.

It is the general object of the present invention to provide a new and improved method of manufacture for color kinescopes.

It is one object of this invention to provide such a method for the manufacture of color kinescopes of the post-deflection demodulation or chromatron type, which avoids one or more of the limitations of the prior methods of manufacture.

It is another object of the invention to provide a new and improved method of manufacturing color phosphor screens which employs a positioning plate so as to insure simple but accurate positioning of an optical mask relative to the face plate.

It is another object of this invention to provide a new and improved method for the manufacture of color phosphor screens which method is suitable for mass production.

Other objects, features and advantages of this invention will become apparent from the following description taken in conjunction with the accompanying drawings in which:

FIG. 16 is a schematic diagram illustrating one example of the manufacturing process according to this invention;

Referring now to the drawings, the present invention will be described in detail as applied to the manufacture of a multicolor phosphor screen for chromatron tubes. This particular type tube and its operation will be first described and then the method of manufacture in accordance with the present invention will be described.

Figures 1, 2, 3, 4, 5:
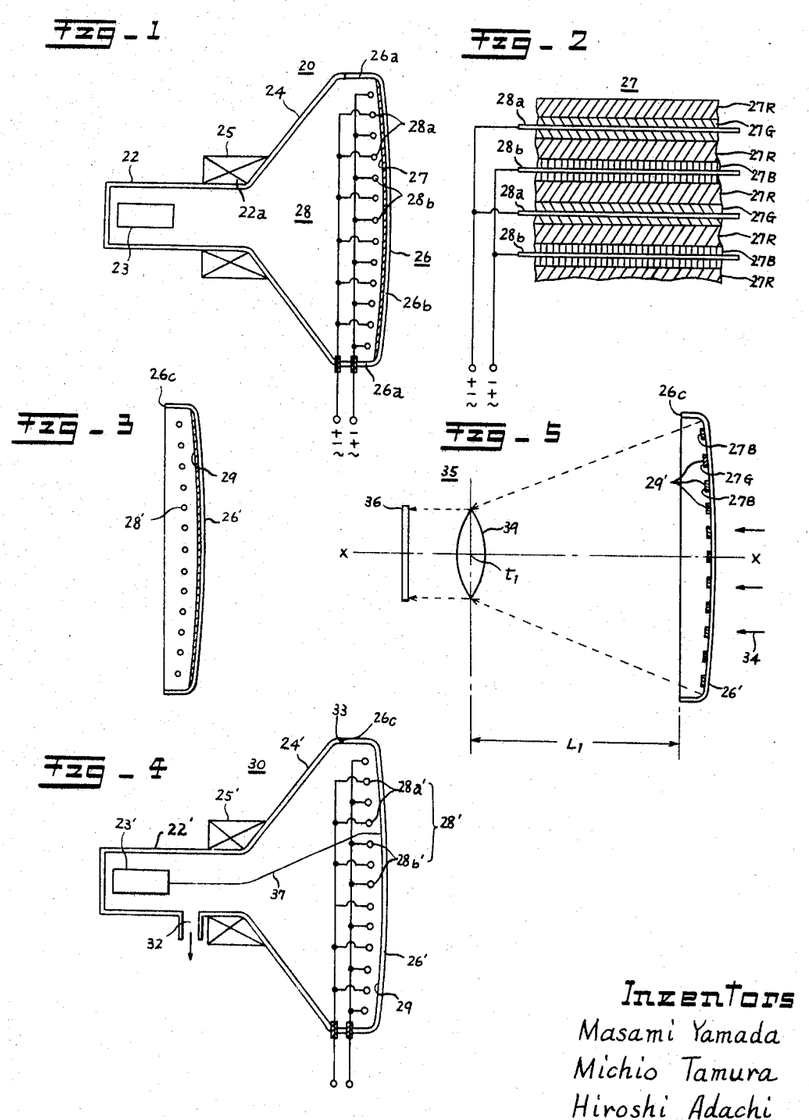
FIG. 1 is a longitudinal cross sectional view schematically illustrating a chromatron-type color kinescope.
FIG. 2 is a partial enlarged inside plan view of the screen of the tube of FIG. 1, showing the relative arrangement of color phosphor strips and grid elements.
FIG. 3 is a schematic cross sectional view of a face plate and associated parts similar to that of the kinescope of FIGS. 1 and 2, which face plate is to be used in the process of forming an optical mask in accordance with one feature of the invention.
FIG. 4 is a longitudinal cross sectional view schematically illustrating an apparatus and step including the face plate of FIG. 3, in the making of the optical mask.
FIG. 5 is a side elevational view schematically illustrating another apparatus and step used in making the mask.

Referring to FIG. 1 there is depicted a chromatron color kinescope generally designated by the numeral 20. The kinescope 20 comprises a glass envelope formed from a generally planar face plate 26, a cylindrical neck portion 22 and a conical portion 24 connecting the face plate 26 and the neck portion 22. The face plate 26 is formed in the shape of a shallow dish with an edge flange or rim 26a rising from about the periphery of a slightly concave but generally planar picture screen receiving portion 26b. The neck 22 and the conical portion 24 are connected at a circular end edge 22a to form a generally funnel-shaped configuration with the face plate 26 covering the large end of the funnel.

Mounted along the cylindrical axis of the neck 22, away from the end edge 22a, is a single electron gun 23 for providing a stream or beam of electrons directed toward the plate 26. Also mounted about the neck 22 at the junction 22a with the conical portion 24 is a deflection yoke 25. The deflection yoke 25 serves the function of deflecting the electron beam from the gun 23 about the evacuated interior of the kinescope 20 to cause the beam to scan or sweep out the interior surface of the face plate 26.

A phosphor screen 27 is formed on the inner surface portion 26b of the face plate 26 comprising a large number of parallel adjacent strips of different color light emitting phosphors arranged in a pattern. Also positioned about the interfacing surface of the screen portion 26b, but spaced from the screen 27, is a post-deflection focusing device and a color switching grid 28 shown in greatly exaggerated size in FIG. 1. The grid 28 comprises two sets of wires 28a and 28b which are interwoven in parallel relation to one another. The individual wires 28a and 28b are arranged in alternating order about a surface generally conforming to that of the screen 27. As depicted, individual wires 28a are all connected in common and to a terminal 28a', while the wires 28b are similarly connected together and to a terminal 28b'.

The interrelationship and ordering of the grid 28 and the phosphor strip screen 27 is best shown in FIG. 2. As there shown, the screen 27 is composed of a plurality of red light emitting phosphor strips 27K, hereinafter referred to as red strips 27R; blue light emitting phosphor strips 27B; hereinafter referred to as blue strips 27B; and green light emitting strips 27G, hereinafter referred to as green strips 27G. The strips are laid down in a repeating cyclic order of red-green-red-blue. The individual wires of the grid 28 are positioned such that the wires 28a each lie approximately parallel to and opposite one of the green strips 27G, and the wires 28B each lie approximately parallel to and opposite one of the blue strips 27B.

Between the grid elements 28a and 28b, a switching signal as, e.g., 3.58 megacycles per second, is applied in synchronism with the color information modulated upon the electron beam at the electron gun 23. The charging of the grid wires 28a positive and the grid wires 28b negative deflects a beam pass therethrough to the green strip 27G, while the reverse polarity of charge deflects the beam to the blue strip 27B. Absence of a relative charge would cause the beam to be focused on and strike the red strip 27R. In the case of a three-gun chromatron tube it is sufficient only to apply a post-deflection-focusing field to the grids. The grid device 28 is usually framed and precisely mounted detachably in opposing relation to the phosphor screen 27. In this case, it is of prime importance to position the grid device 28 relative to the face plate 26 as accurately as possible.

As mentioned above, the phosphor strips must be aligned not in precisely a parallel arrangement but in a manner so as to correct variations in beam trajectory and focus caused by a number of factors. To achieve a proper arrangement of these strips in a mass-produced color television kinescope in an efficient and economical manner is one of the objects of this invention.

In accordance with one feature of the present invention, a light mask for exposing a photosensitive layer on a screen surface is formed. Referring to FIG. 3, there is depicted a glass face plate 26' of the same configuration as the face plate of the kinescopes desired to be manufactured. The first step in forming the light mask is to provide the face plate 26'. The plate 26' is then coated over the entire screen-receiving interior surface 26b' with a material that is sensitive to and hardened by exposure to or impact of an electron beam and forms a coating 29. Next a grid device 28', identical to the grids 28 of the manufactured kinescope 20, is positioned adjacent the inner face of the plate 26' precisely at the location relative to the plate 26' of the grid 28 to the plate 26 of the assembled kinescope 20.

After the face plate has been prepared, as depicted in FIG. 3, it is affixed to a conical portion of an electron beam printing device 30 as depicted in FIG. 4. The beam printing device 30 is substantially the same structure as the finished kinescope 20 except that it is provided with an exhaust pipe 32 from which the air or gas present in the envelope defined by the printing device 30 and the affixed glass plate device 26' may be withdrawn. Accordingly the beam printing device 30 is provided with at least an electron gun device 23', a deflection coil 25' mounted about the junction between the conical portion 24' and cylindrical portion 22' of the device 30. In attaching the face plate 26' to the device 30, an abutting face 26c of an extending peripheral flange 26a' of the face plate 26 is joined to a similar-shaped edge flange 33 of the conical portion 24'. After the face plate portion 26' is affixed to the printing device 30, the device 30 is evacuated to the exhaust pipe 32. The junction between the edge 26c and the edge 33 is preferably sealed by applying a seal material such as grease to the abutting face surfaces to make an airtight joint between the face plate 26' and the device 30. The beam printing device 30 is held under a vacuum, such for example, as $5 \times 10^{-5}$ mm. Hg, which will be employed in actual operation of the television receiver. Under these conditions, an accelerating voltage and a deflection voltage are then applied respectively to the electron gun device 23' and the deflection coil 25'. In this case, however, it is not necessary to apply to the electron gun device 23' voltages in accordance with the red, green and blue color signals. The electron gun device 23' is adapted instead to produce an electron beam of a certain density at all times. Further, the grid device 28' is adapted to be supplied selectively with the voltages which will be employed in the finished tube through the terminals 28a' and 28b'.

With such an arrangement, a potential is applied to the grid device 28' such that the grid elements 28a' are made positive and the grid elements 28b' negative to cause an electron beam 37, in the usual scanning manner, to impinge upon the coated inner face of the face plate 26' at locations which are to be occupied ultimately by the green phosphor strips 27G, creating green image areas.

Following this, a second electron beam printing is carried out by applying to the grid device 28', a potential such as to make the elements 28a' negative and the elements 28b' positive and similarly to cause the electron beam 37 to impinge upon the coated inner face of the face plate 26' in positions which blue phosphor strips 27B will occupy the finished tube, producing blue image areas. With a three-gun chromatron tube, it is sufficient to cause the electron beam emitted from two of the three guns to impinge upon the coated inner face of the face plate.

After the electron beam printing, air is introduced into the device 30 through the exhaust pipe 32 and the face plate 26' with the grid device 28' is disassembled from the conical portion 24' of the device 30. The grid device 28' is also removed from the face plate 26'. Then, the inner face of the face plate 26' is subjected to a developing process which consists in rinsing the inner face of the face plate 26' with, for example, water to wash away selectively the sensitive material layer 29 of those areas which have not been exposed to the electron beam. This leaves void areas which are to form the red phosphor strips 27R in the finished kinescope. This selective removal of the sensitive material layer 29 results in the production of the sensitive material strips 29' which have hardened, at positions to be occupied ultimately by the blue and green phosphor strips 27B and 27G.

After the above-described sequence the face plate 26' is obtained from which a mask is produced for optical printing use in the manufacture of the kinescopes as will hereinbelow be described.

Referring to FIG. 5, there is depicted a photographic device generally indicated by the numeral 35 including a photographic plate 36 and a lens 39, disposed about a parallel plane spaced from and facing each other and centered on a common normal axis X—X. Also centered on the axis X—X, and about a plane normal to that axis, is the face plate 26'. The plate 26' is positioned parallel to and facing the lens 39. The lens 39 and photographic plate 36 are located axially on the center axis X—X of the face plate 26' in a manner so that the center of the lens 39 agrees with a point $t_1$ spaced a distance $L_1$ from the abutting face 26a of the face plate 26'. Prior to the positioning of the face plate 26' in the device 35, material strips 29' which are in the position the strips 27B and 27G assume in a finished face plate 26, may be painted with an opaque paint. As so positioned in the device 35, the photographic plate 36 is exposed to irradiation by light (symbolized by arrows 34) directed generally along the axis X—X from without the face plate 26' and therethrough to the lens 39 and from thence to the photographic plate 36. The light 34 passing through the lens 39 exposes on the photographic plate 36, a latent image that is in accordance with the striped pattern formed by the material stripes 29' on the inner surface of the face plate 26'. The photographic plate 36 may then be subjected to a developing process to obtain a negative plate. The developed negative plate will be generally indicated by the numeral 36'.

An alternative method of producing the negative plate 36' is to first coat the entire inner face of the face plate 26' with a monochrome phosphor layer and subject it to the scanning electron beams in a manner similar to that described with respect to FIG. 1 or FIG. 4 in the same condition as in the actual operation of the television receiver. The scanning pattern of the electron beams may be then directly photographed or traced on a sheet of paper placed on the outer surface of the face plate 26'.

Thus in either manner, the plate 36 may be produced which has a striped pattern formed by the electron beam scanning.

Figure 6:
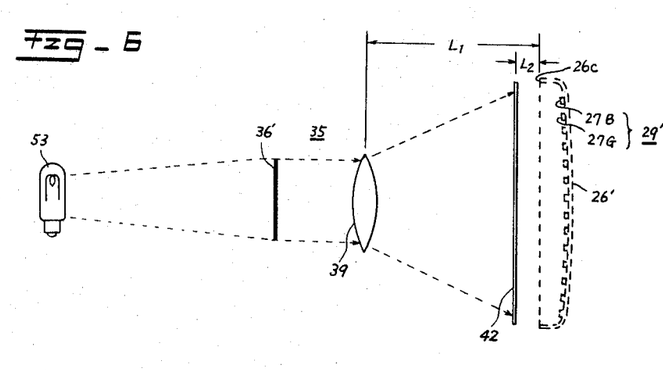
FIG. 6 is a view, similar to that of FIG. 5, schematically illustrating a further apparatus and step in making a mask, and including in dashed outline a part not employed in the apparatus to illustrate relative positions of the parts employed.
Figure 7:
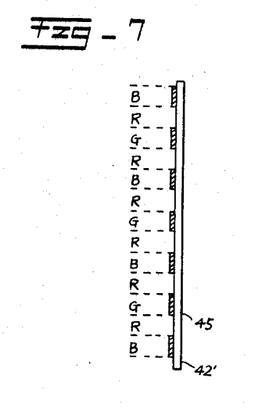
FIG. 7 is a schematic diagram illustrating in cross section one example of a photographic image produced on the optical mask during the manufacturing processes in accordance with this invention.

The next step in the production of a mask for optical printing use is accomplished by making use of the negative plate 36'. As illustrated in FIG. 6, the lens 39 and the negative plate 36' of the photographic device 35 are placed in the relative positions similar to those in FIG. 5, and a photographic plate 42 is disposed on the opposite side from the negative plate 36'. Then the photographic plate 42 is exposed to irradiation by light from a light source 53, such as a conventional electric lamp, printing the photographic image of the negative plate 38 on the photographic plate 42. The photographic plate 42 may be located in any desired position before the lens 39 but is disposed at a place spaced a distance $L_2$ (a minor fraction of $L_1$) from the abutting face 26c position of the face plate 26' of the position the face plate 26' was located at in FIG. 5, i.e., spaced a distance $L_1$ from the lens 39. It is preferred to make the optical mask of a sheet of glass having the same curvature as the inner face of the face plate but in the figure a flat glass plate is depicted for the sake of convenience in illustration. The photographic plate 42, having printed thereon the photographic image of the negative plate 36', is then developed so that an optical mask 42' is produced. The mask 42' is used for forming red phosphor strips as will be described later, and this mask 42' is opaque at places corresponding to blue and green phosphor strips 27B and 27G which will be deposited on the screen of the finished cathode ray tubes, but transparent at places corresponding to red phosphor strips 27R ultimately occupying on the screen that which is best illustrated in FIG. 7. Reference numeral 45 identifies a transparent base of the mask 42'.

Figure 8:
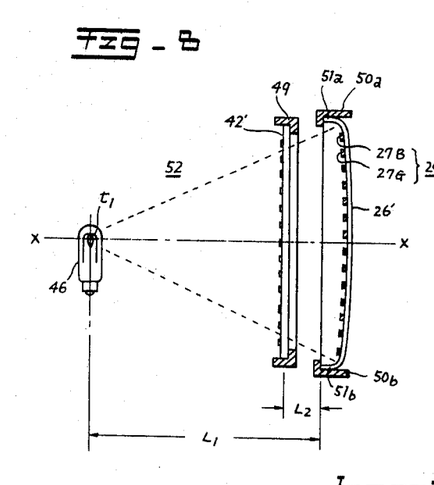
FIG. 8 is a schematic diagram illustrating one example of an optical printing process according to this invention.

Following this, a light source 46 and the optical mask 42' are disposed along the axis X—X of the face plate 26' in the general arrangement as described above with reference to FIG. 5 and as illustrated in FIG. 8. The distances between the light source 46 and the abutting face 26a of the face plate 26', and between the abutting face 26a and the optical mask 42' are selected to be substantially equal to the distances $L_1$ and $L_2$ mentioned previously with respect to FIG. 6, so that the striped pattern of the mask 42' agrees with that of the sensitive material strips 29' deposited on the inner face of the face plate 26'. Reference numeral 49 indicates a fixture for the optical mask 42' which is adapted to move along the axis X—X and is so constructed that the optical mask 42' may be freely inclined to the face of the face plate 26' and may be rotated about the axis X—X in a plane across the axis X—X. Further, reference numerals 50a and 50b represent fixtures for the face plate 26', which have respectively abutting faces 51a and 51b with the abutting face 26a of the face plate 26'. The device including such fixtures and the light source 46 will hereinafter be referred to as an exposing device 52.

Figure 9:
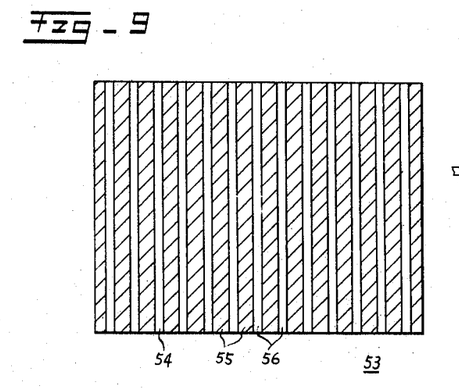
FIG. 9 is a front plan view illustrating one example of a positioning plate usable in this invention.
Figure 10:
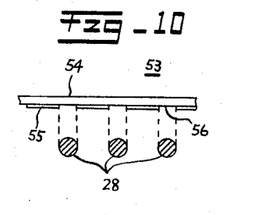
FIG. 10 is a schematic cross sectional view of the plate depicted in FIG. 9.

Then, a positioning mask 53 is prepared such as illustrated in FIG. 9. This positioning mask 53 is produced by depositing a plurality of opaque strips 55 in parallel on a transparent glass plate or film 54, the strips 55 being positioned at regular intervals substantially equal to the diameter of the grid elements 28a or 28b of the grid device 28. In other words, the pitch of the transparent portions 56 is selected nearly equal to that of the grid elements 28a or 28b as may be seen in FIG. 10. It is also preferred to use a glass plate having the same curvature as the inner face of the face plate for this mask 53.

Figure 11:
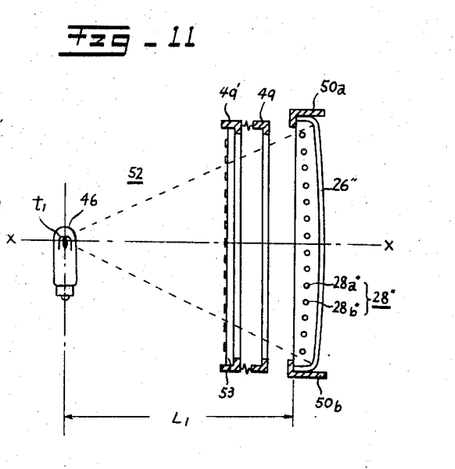
FIG. 11 is a schematic diagram similar to that of FIG. 8 for purposes of illustration of the invention.

Referring now to FIG. 11, the fixtures 49, 50a and 50b are fixed to external stationary parts (not shown), with the mask 42' and the face plate 26' being held in predetermined opposing relation as described previously with respect to FIG. 8, so that the striped pattern of the mask 42' agrees with that produced by the strips 29' on the inner face of the face plate 26'. Under such conditions a face plate 26'', which is to form a color phosphor screen in the finished cathode ray tube, is attached to the fixtures 50a and 50b in place of the face plate 26' and a grid device 28" is also attached to the face plate 26", as illustrated in FIG. 11. Further, the mask 42' is removed from the fixture 49, while the positioning plate 53, described with respect to FIG. 9, is attached to the fixture 49 or a fixture 49' having a certain relation thereto. Then, the striped pattern of the positioning plate 53 is projected through the grid 28" on the face plate 26" by the light source 46. In this case, the inner face of the face plate 26" is not coated with a phosphor material.

Figure 12:
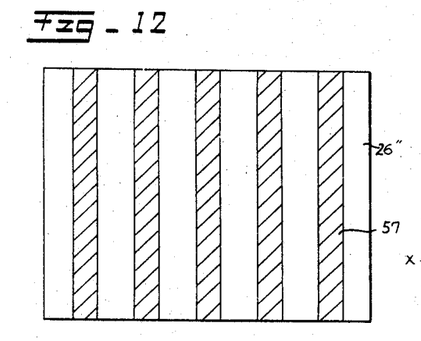
FIGS. 12 to 15, inclusive, are front views of face plates, each having projected thereon a pattern for positioning of the optical mask relative to the face plate.
Figure 13:
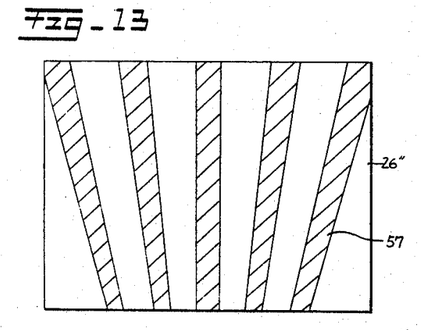
Figure 14:
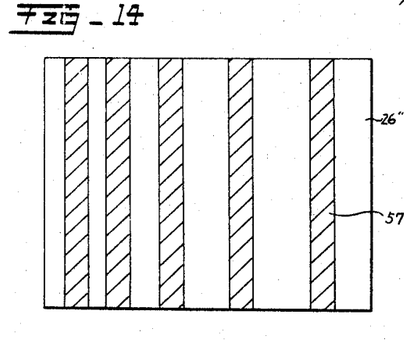
Figure 15:
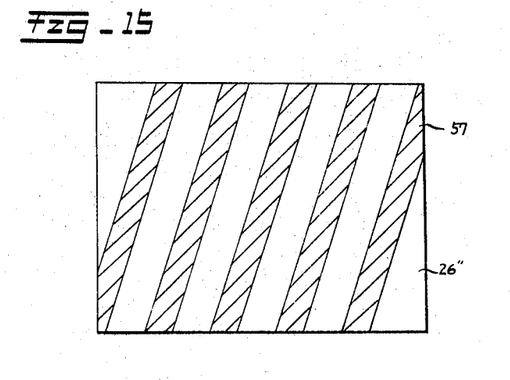

Since the grid elements of the grid device 28" are in parallel relation to one another, straight interference fringes 57 are produced on the face plate 26" by the pattern of the positioning plate 53 and that of the grid elements of the grid device 28". If the positioning plate 53 and the face plate 26" are located exactly in the predetermined opposing relation as described above with respect to FIG. 8, the fringes 57 become bilaterally symmetrical, as illustrated in FIG. 12, the number of the fringes 57 varying with the movement of the positioning plate 53 along the axis X—X of the face plate 26". However, when the positioning plate 53 is inclined in front or in the rear, the fringes 57 expand upwardly or downwardly as depicted in FIG. 13, and when the positioning plate 53 is inclined to the right or left, the pitch of the fringes 57 becomes irregular in the horizontal direction as depicted in FIG. 14. In addition, when the positioning plate 53 is rotated about the axis X—X, the fringes 57 become inclined as illustrated in FIG. 15.

Figure 17:
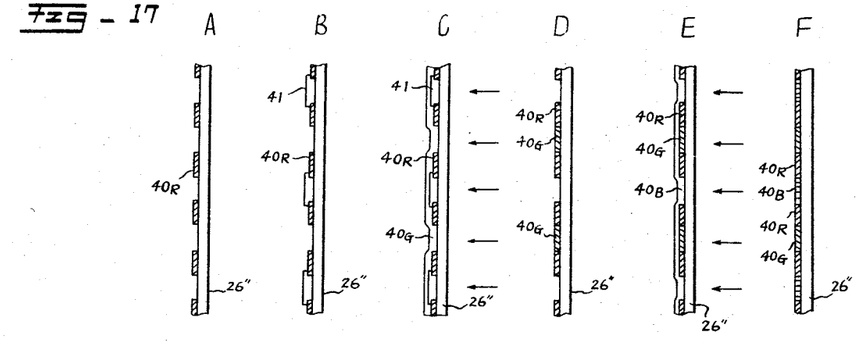
FIGS. 17A to 17F are diagrammatic showings of the steps involved in the process of coating the inner face of the screen.

In accordance with one aspect of this invention, the face plate 26", without a phosphor coating on the inner face thereof, is attached to the fixtures 50a and 50b, together with the grid device 28" as described with respect to FIG. 11, and the aforementioned positioning plate 53 is also attached to the fixture at, for example 49. They are then adjusted in position so that the desired interference fringes 57 such as shown in FIG. 12 may appear on the face plate 26", and the fixtures 49', 49 and 50a, 50b are fixed to the stationary parts. Following this, the positioning plate 53 is removed from the fixture 49' and the optical mask illustrated in FIG. 7 is attached to the fixture 49. Further, the face plate 26" is removed and the grid device 28" is then disassembled therefrom. After this, a phosphor slurry which consists of a red phosphor and a photosensitive lacquer is deposited over the entire inner face of the face plate 26" to form thereon a slurry layer 40R, and the face plate 26" is again attached to the fixtures 50a and 50b. The photosensitive lacquer may be a mixture which consists of polyvinyl alcohol, ammonium dichromate and water glass. The mask 42' and the face plate 26" are held in the predetermined opposing relation. The coated inner face of the face plate 26" is then exposed to irradiation by light through the mask 42' from the light source 46 so that the striped pattern of the mask 42' is projected on the red phosphor slurry layer 40R. The photosensitive material is usually highly sensitive to ultraviolet rays and accordingly a xenon lamp, a mercury-arc lamp or the like is employed as the light source 46. As seen in FIG. 17A, during this exposure to the light only some portions of the red phosphor slurry layer 40R are exposed to the light, since the other remaining portions of the layer 40R are masked by the opaque portions of the mask 42'. The red phosphor slurry on those areas which have been exposed to the light is hardened. In the next stage, the excess phosphor layer which has not been exposed to the light is washed off by rinsing with water, leaving the hardened red phosphor strips 40R.

After the formation of the red phosphor strips 40R, they are painted opaque and a material 41, such, for example, as wax or enamel which is a light-transmitting inhibitor and is readily removed by a solvent, may be deposited in every other void area between the red phosphor or strips 20R as illustrated in FIG. 17B. This deposition may take place by any desired method such as spraying, since the red phosphor strips 40R are spaced apart a considerable distance from adjacent ones. Then, a green phosphor slurry is deposited over the entire inner face of the face plate 6" as illustrated in FIG. 17C by the reference numeral 40G. This coated face is exposed to irradiation by light from the outside of the face plate without using a mask, after which the coated face is rinsed with water to remove selectively the excess green phosphor slurry on those areas which have not been exposed to the light, and then the material 41 such as wax previously deposited in the void areas between the red phosphor strips 40R is removed by rinsing with toluene or acetone. This results in a deposition of the green phosphor strips 40G between the red phosphor strips 40R in alternating relation as depicted in FIG. 17D. The red and green phosphor strips 40R and 40G, deposited on the inner face of the face plate 26", are painted opaque as in the preceding process. Next, the entire inner face of the face plate 26" is given a coating wtih a blue phosphor slurry as illustrated in FIG. 17E at reference numeral 40B, thereafter being subjected to irradiation by light from the outside of the face plate 26". During this exposure, the portions of the blue phosphor slurry coated in the remaining void areas between the red phosphor strips 40R are hardened by exposure to the light. The inner face of the face plate 26" is then rinsed with water, leaving the blue phosphor strips 40B as illustrated in FIG. 17F. In this manner, a phosphor screen is produced which consists of the red, green and blue phosphor strips sequentially arranged in the order of red-green-red-blue-red-green, etc.

In the foregoing, alternate void areas between the red phosphor strips 40R are masked from the light by the light-transmitting inhibitor material such as wax or the like for the production of the blue or green phosphor strips in the process shown in FIG. 16. An alternative is, however, to have only specified portions of the blue or green phosphor slurry coating selectively exposed to the light by changing the relative position of the optical mask 42' to the face plate 26" and thus eliminate the need for using the light-transmitting inhibitor material.

In this invention, the optical mask 42' is positioned relative to the face plate 26" and consequently to the grid device 28" with the aid of the positioning plate 53 as described previously, so that the positioning of the mask 42' is easy and precise. That is, the grid elements 28a and 28b are stretched in parallel relation but in fact the phosphor strips to be ultimately deposited on the inner face of the face plate 26" are not necessarily parallel with one another. As a result of this, the striped pattern of the optical mask 42' is not strictly in parallel. Hence, in the case where the mask 42' is positioned relative to the face plate 26" depending upon the interference fringes caused by the patterns of the mask 42' and the grid elements of the grid device 28", the interference fringes become so complicated that the positioning of the mask 42' cannot be accomplished accurately. However, with the use of the positioning plate 33 having attached thereon a plurality of parallel stripes, as illustrated in FIG. 9, the optical mask 42' can easily be placed in a predetermined position relative to the face plate 26" as has been described and illustrated in FIGS. 12 to 15.

Figure 18:
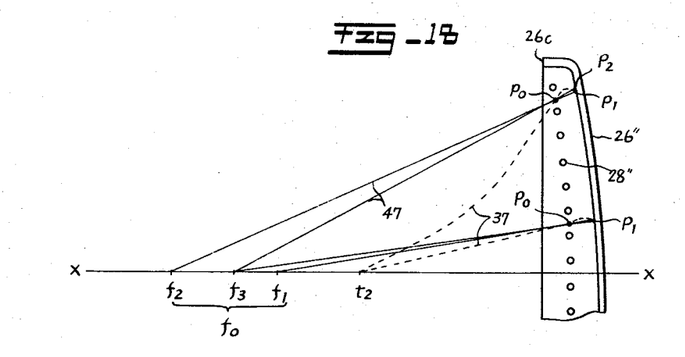
FIG. 18 is a schematic diagram for explaining this invention.

Further, if the distance $L_1$ between the lens 39 and the face plate 26' is selected suitably in the production of the negative plate 38 described with reference to FIG. 5, the deposition of the red phosphor slurry layer 40R on the inner face of the face plate 26" can be carried out without removing the grid device from the face plate 26" in the process disclosed in connection with FIG. 16. As clearly seen in FIG. 18, an electron beam 37 emitted from the electron gun device is caused to pass a point $P_0$ between adjacent grid elements and deflected by the focusing potential established between the grid device 28" and the conductive layer of the face plate 26" or the metal-back layer thereof, thereafter being impinged upon the inner face of the face plate 26" at a point $P_1$. Reference numeral $t_2$ indicates the deflection center of the electron beam. The line joining the points $P_1$ and $P_0$ is drawn to the axis X—X of the face plate 26″ and the intersecting point is generally designated at $f_0$. The position of the intersecting point $f_0$ slightly varies with that of the impingement of the electron beam on the inner face of the face plate. As clearly shown in the figure, the electron bombardment on the center portion of the inner face, the intersecting point $f_0$ shifts to a point indicated at $f_1$ and in the case of the peripheral portion, the point $f_0$ shifts to a point $f_2$. Therefore, if the lens 19 is located at an intermediate point $f_3$ between the points $f_1$ and $f_2$ in the process described in FIG. 5, the grid elements of the grid device 28″ do not lie in the path of the light irradiated through the mask 42′ in the process described with reference to FIG. 16. According to an experiment, with one version of a chromatron tube in which the difference was measured between the point $P_1$ and point $P_2$ of the arrival of a light beam 47 on the inner face of the face plate 26″ from a light source located at the point $f_3$ under such conditions that the distance $L_1$ between the abutting face 6a of the face plate 26″ and the point $t_1$ was approximately 235 mm. and the space between adjacent grid elements of the grid device 28″ was 0.4375 mm., the difference was only 0.08 mm. at maximum. Since the width of the stripes of the mask 42′ is usually 0.22 mm., the grid elements of the grid device 8″ are shaded by the stripes of the mask 42′ even in the case of such a maximum difference being present, and accordingly the grid elements of the grid device 28″ do not lie in the path of the light beam 47. As a result of this, once the optical mask 42′ is attached to the proximity of the grid device 28″ in the process shown in FIG. 8, the relative arrangement of the mask 42′ and the face plate 26″ can easily be accomplished, and thereafter it is only required to position accurately the light source 46 and the face plate 26″ relative to each other for optical printing of the red phosphor slurry layer 40R.

In the three-gun chromatron-type cathode ray tube the phosphor strips are arranged in a repeating cyclic order of red-green-blue, and accordingly the three-color phosphor screen can be produced by only shifting the optical mask after the deposition of the phosphor strips of one of the three colors.

Although the present invention has been described with reference to the manufacture of the multicolor phosphor screen for the chromatron-type color cathode ray tube, the invention may also be applied to the color phosphor screen for other types of color cathode ray tubes.

It will be apparent that many modifications and variations may be effected without departing from the scope of the novel concept of this invention.

What we claim is:
1. The method of making a color screen for a kinescope comprising the steps:
   mounting postdeflection-focusing means on a face plate;
   providing a positioning mask having a pattern corresponding to that of said postdeflection-focusing means;
   holding the positioning mask and the face plate in relative positions;
   subjecting the positioning mask to illumination to project an image from the mask on the face plate;
   adjusting the relative positions of the positioning mask and the face plate until a pattern resulting from interference due to disagreement between the patterns of the positioning mask and the postdeflection-focusing means becomes a predetermined pattern;
   replacing the positioning mask with an optical mask having a predetermined pattern;
   coating a phosphor slurry on the inner face of the face plate; and
   subjecting the coated inner face of the face plate to irradiation by light through said optical mask.

2. The method of making a color screen for cathode ray tubes as claimed in claim 1 wherein the optical mask has the same pattern as that produced by electron beam printing on the face plate.

3. The method of making a color screen for cathode ray tubes as claimed in claim 1 wherein the positioning mask is opaque at places corresponding to the passage of electron beams deflected by the postdeflection-focusing means.

4. The method of making a color screen for cathode ray tubes as claimed in claim 1 wherein a point source of light is employed in the exposure of the coated inner face of the face plate to irradiation by light through the optical mask.

5. The process of manufacturing color kinescopes which includes at least the steps of:
   (a) providing a face plate having a generally planar surface capable of receiving the phosphors of a finished kinescope screen;
   (b) affixing a postdeflection device adjacent to but spaced from said face plate surface in a position corresponding to that of such a device in a finished color kinescope;
   (c) placing a positioning mask having a predetermined pattern adjacent to but spaced from said postdeflection device;
   (d) projecting light on the positioning mask, the device and the face plate such that a shadow image of the positioning mask and the device are superimposed upon each other on said surface;
   (e) adjusting the relative position of said face plate and said positioning mask so as to achieve a predetermined resulting pattern on said surface;
   (f) replacing in its adjusted position the positioning mask by an optical mask having a predetermined pattern;
   (g) coating said surface of said face plate with a phosphor slurry;
   (h) projecting light through said optical mask to said slurry on said surface to selectively harden said phosphor in a predetermined pattern;
   (i) removing the unhardened slurry from said surface; and
   (j) mounting and affixing said face plate in and as part of a kinescope.

6. The process of manufacturing color kinescopes as claimed in claim 5 in which said positioning mask having a predetermined pattern has said pattern formed to substantially duplicate the shadow pattern of said postdeflection device.

7. The process of manufacturing color kinescopes as claimed in claim 5 in which said optical mask is formed by the process:
   (a) providing a face plate of the same configuration and size as that of the color kinescope to be manufactured;
   (b) affixing a postdeflection device adjacent to but spaced from the surface of said face plate upon which, in a finished color kinescope, a phosphor screen would be affixed, in the position such device would occupy in such a finished kinescope;
   (c) coating said surface of said face plate with a material that is sensitive to and hardened by electron bombardment;
   (d) scanning said screen and device in the manner of a finished kinescope with an electron beam while biasing said device in the same manner as to produce essentially a single color in such a kinescope to selectively harden said coating in a pattern;
   (e) removing the unhardened portion of said coating;
   (f) projecting light through said face plate to expose a photographic plate thereby; and
   (g) developing the negative of said photographic plate to form said mask.

8. The process of manufacturing color kinescopes as claimed in claim 5 in which kinescopes are of the chromatron type and said postdeflection device comprises a plurality of parallel individual grid wires arranged about a surface and said phosphor screen comprises a plurality of generally parallel phosphor strips.

9. The process of manufacturing color kinescopes as claimed in claim 8 in which said positioning mask has a pattern formed of a plurality of spaced parallel transparent portions arranged to conform with the arrangement and thickness of said postdeflection grid.

10. The process of manufacturing color kinescopes as claimed in claim 9 in which said optical mask has a pattern of transparency corresponding to those phosphor strips to be formed on the screen surface intermediate the phosphor strips to be formed opposite the individual grid wires.

11. The method of manufacturing color kinescopes as claimed in claim 10 in which the applied phosphor slurry consists of a phosphor and a photosensitive lacquer comprising a mixture of polyvinyl alcohol, ammonium dichromate and water glass.

12. The method of manufacturing color kinescopes as claimed in claim 11 in which said light projected through the optical mask has one essential apparent point of dispersion and said light includes a high concentration of ultraviolet light.

13. The process of manufacturing color kinescopes as claimed in claim 5 in which additional phosphors are formed on said surface by the additional steps, after step (i) of:
  (1) painting said hardened phosphor areas with opaque paint;
  (2) coating said surface with a second phosphor slurry of another color light emitting phosphor;
  (3) projecting light through said face plate to said screen surface so as to selectively harden said second slurry on said surface; and
  (4) removing the unhardened part of said second phosphor slurry.

14. The process of manufacturing color kinescopes as claimed in claim 13 in which selected areas between the hardened areas of said surface are coated with a light-transmitting inhibitor prior to the coating of said surface with said second phosphor slurry and the projecting of light through said face plate and said inhibitor is removed after the hardening of said second phosphor slurry, the hardened phosphor of said second slurry thereafter being painted with an opaque paint and a third phosphor slurry having a phosphor of a third color light emitting kind being coated on said surface and light is again projected as in additional step 3 of claim 13 to harden said third slurry on the remaining areas of said surface, and said unhardened third slurry is then removed.

15. The process of manufacturing color kinescopes as claimed in claim 14 in which the kinescopes to be manufactured are of the strip screen type, said postdeflection-focusing device is of the parallel grid wire type, the first phosphor slurry contains red light emitting phosphor, one of said second and third phosphor slurries contains green light emitting phosphor and the other of said second and third slurries contains blue light emitting phosphor.

References Cited

UNITED STATES PATENTS

| | | | |
|---|---|---|---|
| 2,568,448 | 9/1951 | Hansen | 96—36.1 XR |
| 2,989,398 | 6/1961 | Bingley | 96—36.1 |
| 2,947,798 | 8/1960 | Heil. | |
| 3,067,349 | 12/1962 | Kasperowicz et al. | 96—36.1 XR |

NORMAN G. TORCHIN, *Primary Examiner.*

J. R. EVERETT, *Assistant Examiner.*

U.S. Cl. X.R.

313—92; 117—33.5